United States Patent [19]

Pompei et al.

[11] 4,111,478
[45] Sep. 5, 1978

[54] SYSTEM FOR CONTROLLING THE DEFORMATION OF SIDE ELEMENTS OF VEHICLE BUMPERS

[75] Inventors: Michel Pompei, Paris; Christian Robert Casse, St. Cloud, both of France

[73] Assignee: Paulstra, Levallois Perret, France

[21] Appl. No.: 765,603

[22] Filed: Feb. 4, 1977

[30] Foreign Application Priority Data

Feb. 5, 1976 [FR] France .................. 76 03194

[51] Int. Cl.² ........................................... B60R 19/02
[52] U.S. Cl. .................................. 293/63; 293/71 R; 293/96
[58] Field of Search ................ 293/60, 62, 70, 71 R, 293/96, 98, 1, DIG. 3, 63, 88; 188/1 C

[56] References Cited

U.S. PATENT DOCUMENTS

| | | | |
|---|---|---|---|
| 3,784,182 | 1/1974 | Sobel | 188/1 C X |
| 3,841,680 | 10/1974 | Muller | 293/71 R |
| 3,880,454 | 4/1975 | Häberle et al. | 293/71 R |
| 3,937,508 | 2/1976 | Glance | 293/96 X |

Primary Examiner—Trygve M. Blix
Assistant Examiner—Sherman D. Basinger
Attorney, Agent, or Firm—Browdy and Neimark

[57] ABSTRACT

Plastic or elastomeric side elements of automobile bumpers are provided with shaped plates, attached thereto or embedded therein, which plates control the direction of buckling of the side elements when the bumper is driven inwardly upon impact of the vehicle. This inhibits damage to the fenders of the vehicle.

7 Claims, 6 Drawing Figures

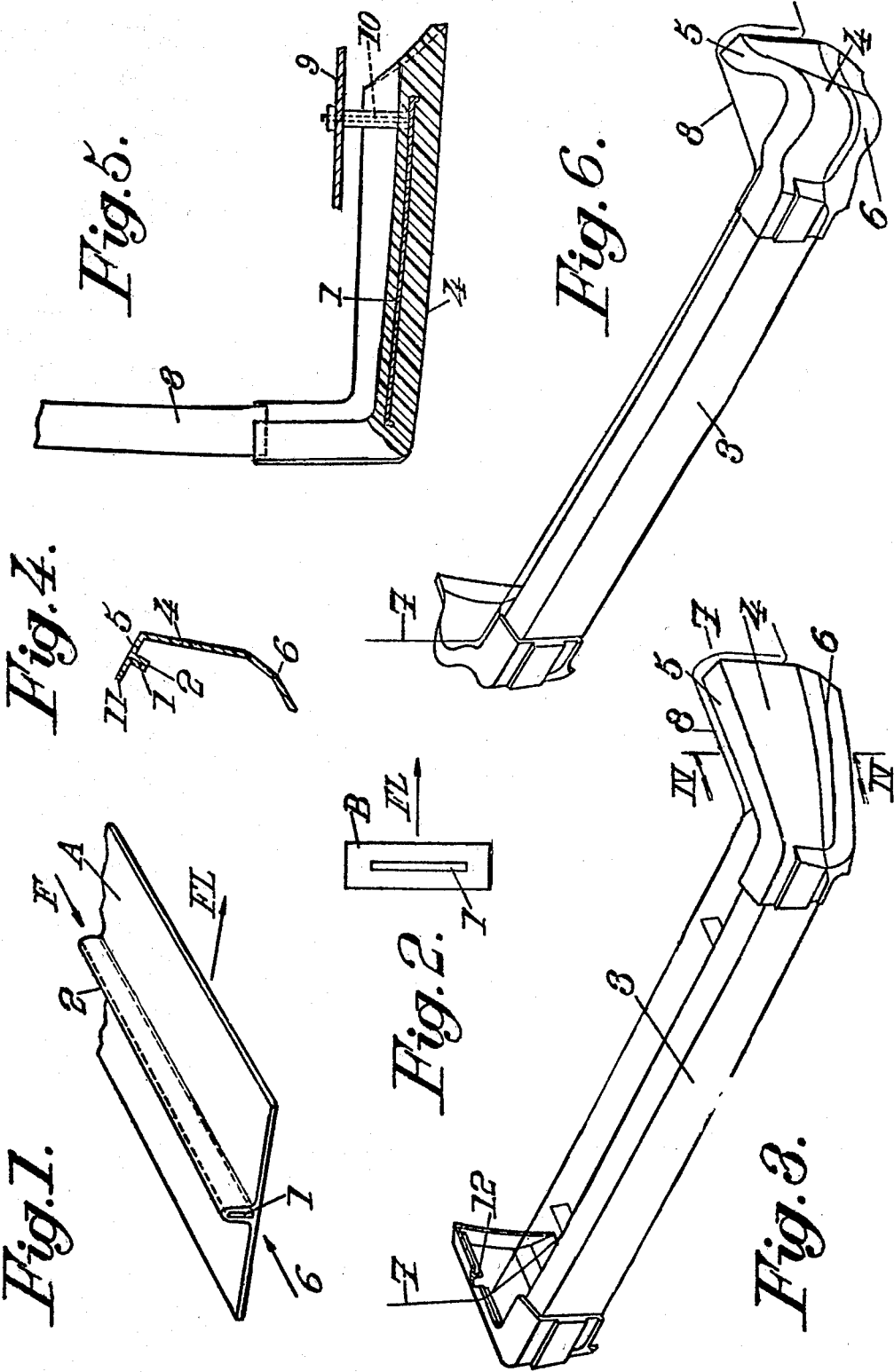

SYSTEM FOR CONTROLLING THE DEFORMATION OF SIDE ELEMENTS OF VEHICLE BUMPERS

FIELD OF THE INVENTION

The invention relates to means for controlling the deformation of parts, particularly those made of plastic, i.e. to orient the deformation, in particular buckling of these parts, in a particular direction, with a view in particular to avoiding uncontrolled folding in other directions; it relates, more particularly, among other possible applications, to side elements of vehicle bumpers.

BACKGROUND OF THE INVENTION

It is known that greater and greater use is being made of plastic or elastomer side elements at the ends of automobile bumpers, which elements wrap around the fenders of the car body and frequently fit in below the lower edges of the fenders. Since the rearward ends of these elements are generally attached to the chassis or to another part of the vehicle, deformation of the principal bumper toward the rear, under the influence of an impact, causes such side elements to buckle. Practice shows that, in view of the shape of these elements, and the rather variable inertia of their component elements, the effect of the buckling is to fold the edges in contact with the corresponding lower edges of the fenders, thus deforming the latter.

SUMMARY OF THE INVENTION

It is thus desirable and an object of the invention to arrange for the buckling of said elements to occur, even at their edges, as strictly as possible in a direction horizontal or perpendicular to the car body. It is a more general objective of the invention to overcome the defects of the prior art; another object is to provide for control of deformation of parts; and yet another object is to provide improved bumper side elements.

To achieve these goals according to the invention, armatures, made of steel for example, are added to the elements of the type in question (whatever may be the application in view), e.g. of synthetic deformable material, the shape (and consequently the inertia) of said armatures being chosen such that deformation is favored or can only occur in a particular direction.

If the shapes of the elements are relatively simple, for example rectangular, the armature considered will be in particular a strip of steel or other strong and rigid material relative to the synthetic deformable material whose cross section will follow the direction of one of the sides of such shape. If these elements have a more complex shape, recourse will be had to strips or other appropriate armatures which can be mounted transversely to certain parts of the elements so that they can guide the direction of buckling thereof.

The armatures can be embedded in the mass of the elements in question with or without adhesion to the material thereof. On the other hand, they can be disposed on the surface and made integral with the elements by any suitable mechanical or other means, e.g. gluing or adhesion.

By varying the mechanical characteristics (elasticity, plasticity, damping, etc.) of the added armatures, it will be possible to render the deformation elastic or permanent and to damp the movement, which is useful in the aforementioned application to bumpers.

In addition to these provisions, the invention includes certain other provisions which are used preferably at the same time and which are discussed more explicitly hereinbelow.

The invention relates particularly to a certain method of application (that in which it is applied to the means of the type in question for vehicle bumpers) as well as certain embodiments of said provisions; still more particularly it relates, as a new industrial product, to the means of the type in question comprising application of these provisions, as well as the special elements peculiar to their realization and vehicles or other assemblies having such means.

In any event, the invention will be more thoroughly understood with the aid of the detailed description of embodiments set forth below, as well as of the attached drawings, such description and drawings being, naturally, provided chiefly for exemplary purposes.

BRIEF DESCRIPTION OF THE DRAWING

FIG. 1 is a perspective view, partially cut away, of a part with a flattened shape, made of plastic for example, subjected to buckling stresses and provided with exemplary means according to the invention to ensure that this buckling takes a given general direction.

FIG. 2 shows a cross section of a plastic part, rectangular in cross section, similarly provided with an armature to ensure buckling in a given direction. FIGS. 3 and 4 show respectively in perspective and schematically, with cutaway portions, the front of a vehicle whose bumper is provided, on lateral trailing elements, with means according to the invention to ensure buckling of these elements along directions essentially perpendicular to the car body.

FIG. 5, on a larger scale, shows said bumper partially cut away.

Finally, FIG. 6 is a view similar to that of FIG. 3 showing the bumper in a retracted position after it has received an impact, the whole being according to the invention.

DETAILED DESCRIPTION OF EMBODIMENTS

According to the invention, especially according to those of its embodiments and forms of its various parts to which it presently appears that preference should be accorded, there being available a vehicle bumper with plastic or elastomer side elements, mounted for example below the fenders, in particular fitted into a recess at the base of the latter, and it being proposed that this bumper be provided with means for ensuring that these elements deform properly in the horizontal direction without folds forming at the edges below the fenders, one proceeds as follows or similarly.

To illustrate the invention two diagrams are first presented, in FIGS. 1 and 2 respectively, showing the manner in which the armatures according to the invention act.

FIG. 1 shows a plastic part, e.g. substantially flat in shape, which is subjected at its ends, i.e., endwise, to stresses F tending to buckle it, one end being fixed for example and the stresses being applied to the other end. Assuming that it is desired, as will be the case in an application to the car bumper described below, that part A undergo buckling FL substantially in its plane, this part A is made in accordance with the present invention to include at least one transverse armature 1, for example a strip of steel or other hard material, extending transversely, i.e. generally perpendicular to the general plane of part A.

The same would be done for a part B (FIG. 2) with for example a rectanglar cross section, subjected to endwise stresses and which, it is desired, will buckle only in a direction FL. Here again, an armature 1 will be provided in a direction transverse to FL.

In each case the armature 1 will be attached by any appropriate means, preferably embedded in the plastic, as shown in FIGS. 1 and 2. In particular, in the case of FIG. 1, the armature 1 is embedded in a rib 2 integral with the plastic of body A.

Applying this principle to the case of a front or rear vehicle bumper with plastic side elements, such a bumper is shown in FIGS. 3 to 6. The bumper 3 may be of any appropriate type. It has plastic side elements 4 which fit into the ends thereof. The section of the bumper 3 can be more or less variable, as may its thickness. It may be seen from FIG. 4 that the side elements 4 have a substantially vertical principal wall with an upper lip 5 and a lower lip 6 which may be inclined or even horizontal in orientation.

The set of each of these elements 4 is placed in an appropriate recess under the fender 7 such that upper lip 5 is generally in the immediate vicinity of a corresponding edge 8 of the fender. Finally, the rear part of each element 5 will usually be fixed with respect to the chassis 9 or to any other part of the vehicle by an appropriate means such as those shown at 10 in FIG. 5.

It will thus be seen, as illustrated in FIG. 6, that the deformation of bumper 3 toward the rear, when an impact is received, causes the plastic or elastic materials of element 4 to buckle.

These elements, due to their fairly complex shape and if no other means is provided, give rise to fairly irregular bucklings. In particular, trailing upper edge 5 tends to exhibit folds which, upon contact with a corresponding edge 8 of the fender, cause permanent deformation thereof, as has frequently been found.

To these side elements 4, or at least to some of their walls, can be added means according to the invention to direct this buckling substantially in a horizontal plane. Thus, the wall of the upper lip 5 may be treated in the manner illustrated in FIG. 1, namely by causing it to have at least one rib 3 in which an armature 1, running transversely to said wall, is embedded. This armature which, in the drawings (see FIG. 4), has been shown more or less in the middle of the width of lip 5, can be disposed nearer to the end 11 of the upper lip 5, if desired. Several such armatures can be provided.

By means of the above, and by making appropriate modifications to the shapes, and to the inertia, of armatures 1 in question, bumper side elements with directed buckling can thus be made.

In addition, by reason of their elasticity, their plasticity, and their damping, etc., these armatures can affect the energy absorption function of the bumper.

Hence, whatever the embodiment adopted, bumpers can be made whose function is sufficiently close to the foregoing that there would be no point in entering into further details thereof which can be readily ascertained by those having skill in the art, and which, by comparison with those of the type in question that already exist, have numerous advantages, in particular:

that of permitting improved mounting of the side elements, that of preventing the deformation of the side elements from damaging the fenders, and that of better shock absorption.

It goes without saying, as indeed it emerges from the foregoing, that the invention is in no way confined to those of its embodiments and means of implementation specially treated; on the contrary, it covers all variants.

What is claimed is:

1. In a side element for motor vehicle bumpers formed of synthetic deformable material and having at least one generally planar surface, the improvement comprising armature means, formed of strong and rigid material relative to said synthetic deformable material, to ensure that upon deformation of said side element said generally planar surface will buckle substantially in a direction transverse to said armature means, said armature means comprising a generally planar plate, said plate being at least partially embedded in said generally planar surface of said side element, and extending generally perpendicular to the plane of the synthetic deformable material in which it is at least partially embedded, whereby the plane of said deformable material and the plane of said armature are disposed at approximately right angles.

2. A device in accordance with claim 1, wherein said plate is incorporated into a rib in said side element.

3. A device in accordance with claim 1, wherein said plate projects from said generally planar surface of said synthetic deformable material.

4. A device in accordance with claim 1, wherein said plate at least partially embedded in said generally planar surface of synthetic deformable material of said side element constitute means to control buckling of said side element in the horizontal direction when the bumper receives an impact.

5. A device in accordance with claim 1, wherein said side element has a lip curved back and adapted to extend under the corresponding fender of the motor vehicle, said lip comprising said generally planar surface of synthetic deformable material of said side element in which said plate is at least partially embedded.

6. A device in accordance with claim 1, wherein said synthetic deformable material is a synthetic plastic.

7. A device in accordance with claim 1, wherein said synthetic deformable material is an elastomer.

* * * * *